March 9, 1954 I. HARRISON 2,671,301
CRANBERRY HARVESTER
Filed April 11, 1951 6 Sheets-Sheet 2

Inventor:
Isaac Harrison
by his Attorneys
Howson &
Howson

March 9, 1954  I. HARRISON  2,671,301

CRANBERRY HARVESTER

Filed April 11, 1951  6 Sheets-Sheet 3

Inventor:
Isaac Harrison
by his Attorneys
Howson &
Howson

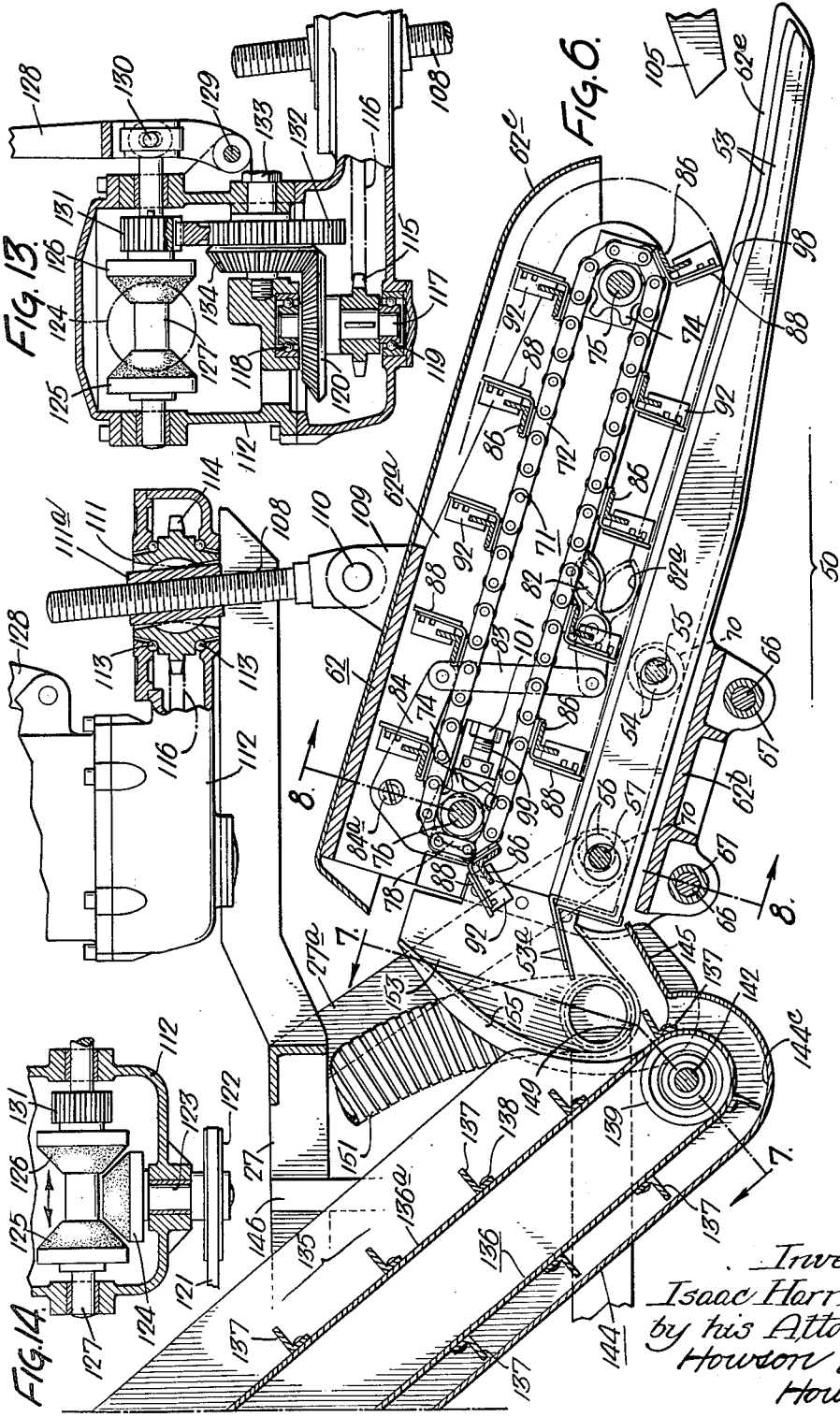

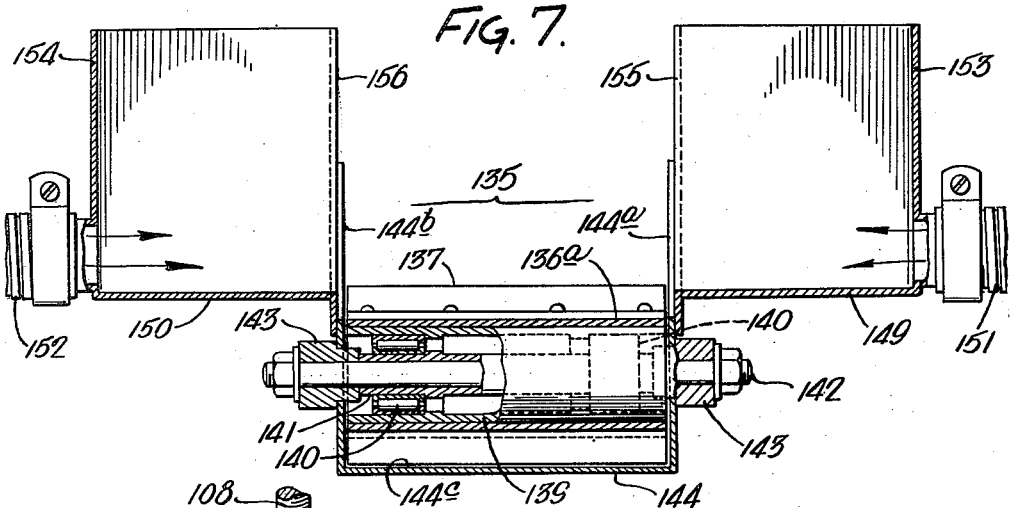
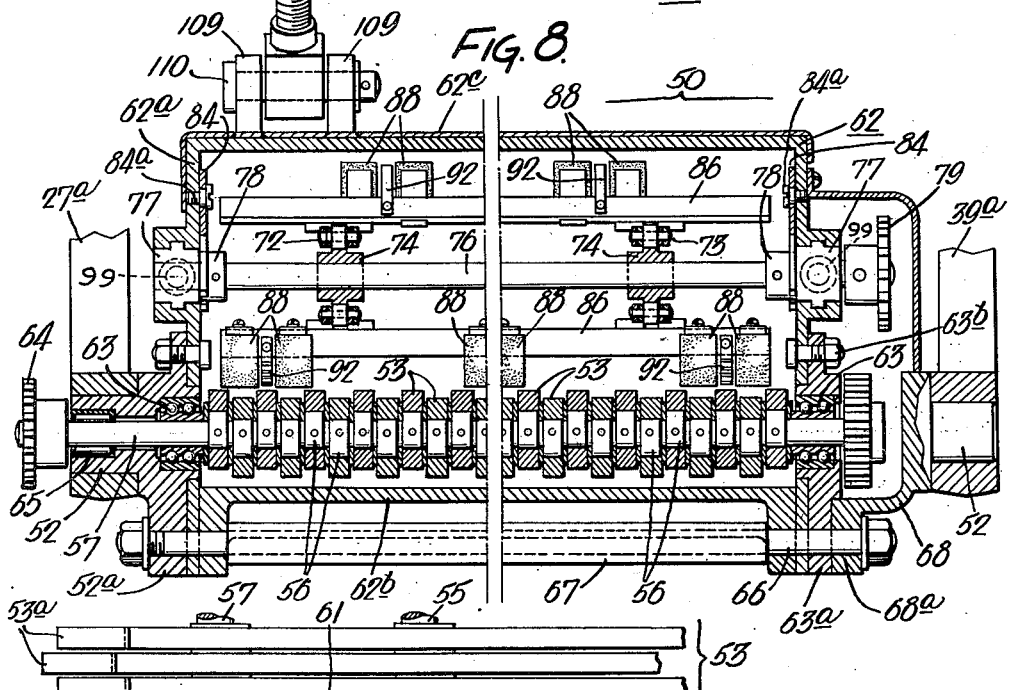
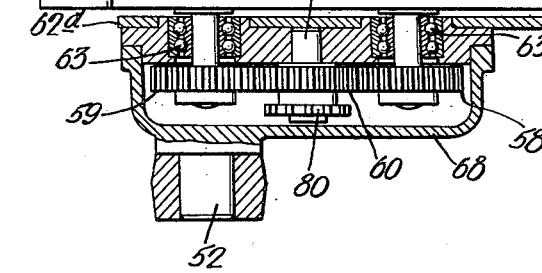

March 9, 1954  I. HARRISON  2,671,301
CRANBERRY HARVESTER
Filed April 11, 1951  6 Sheets-Sheet 6
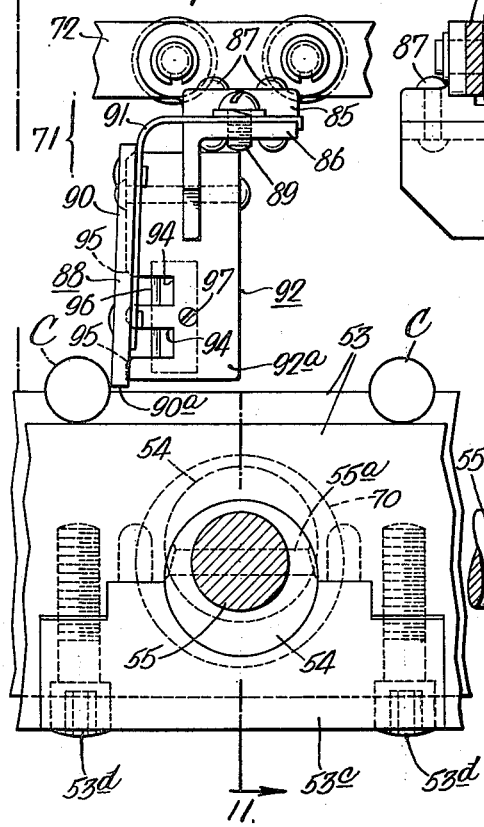
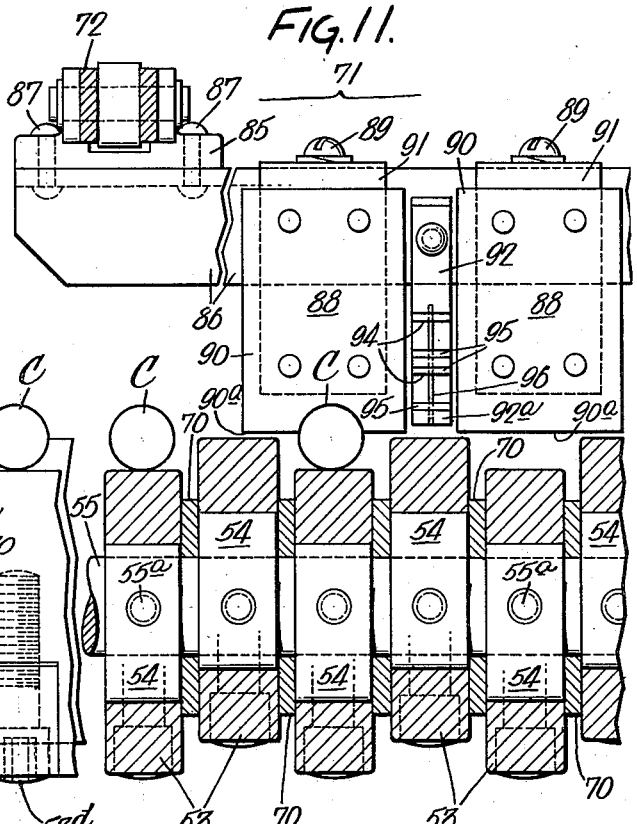
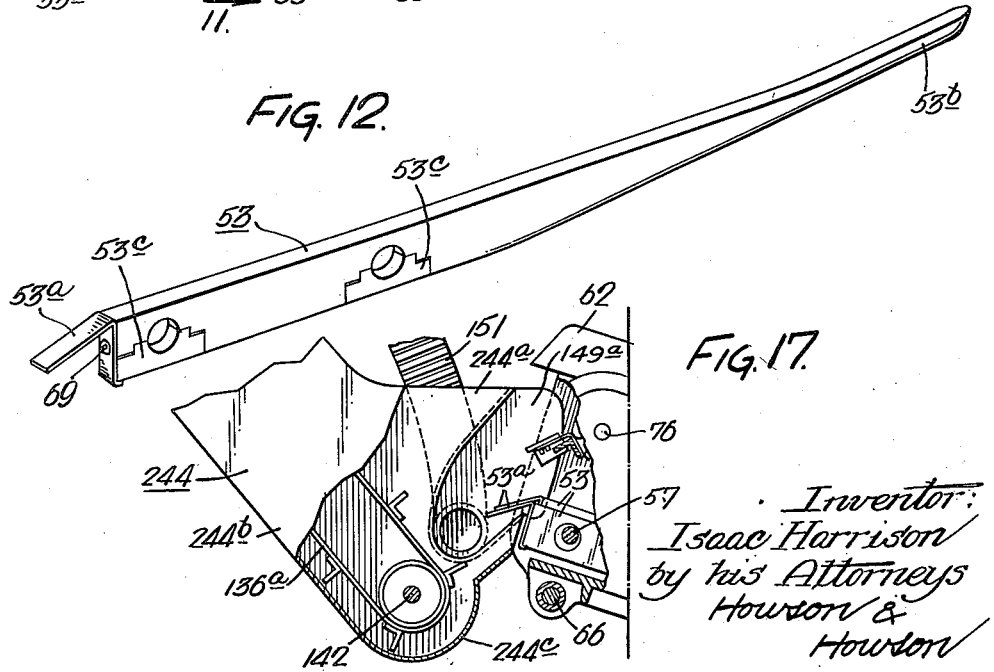
Inventor:
Isaac Harrison
by his Attorneys
Howson &
Howson Patented Mar. 9, 1954

2,671,301

UNITED STATES PATENT OFFICE 2,671,301

CRANBERRY HARVESTER

Isaac Harrison, Crosswicks, N. J.

Application April 11, 1951, Serial No. 220,463

30 Claims. (Cl. 56—330)

This invention relates to apparatus for harvesting cranberries and has to do more particularly with a self-propelled cranberry harvester which incorporates suitable elevating and loading mechanism for the berries.

Although I am familiar with several self-propelled or machine cranberry harvesters, all of these have been open to one or more serious objections. In the first place, the picking fingers or picking mechanism of a satisfactory cranberry harvester must operate in such a way that they do not become entangled in the vines, they must not crush the cranberries, and they must be capable of accurate and rapid adjustment in height to provide for varying conditions which occur in the bog.

It is also desirable that foreign material such as chaff and twigs, be separated from the cranberries before they are loaded into baskets or other containers, and for this purpose I provide suitable blowers which not only remove such foreign material, but also assist in conveying the berries from the gathering mechanism to the elevator.

A primary object of my invention therefore, is to provide a relatively lightweight self-propelled cranberry harvester having a gathering head or scoop which delivers cranberries into an elevator, which in turn deposits the berries in a manually operated intermittent basket loader.

A further object of the invention is to provide in a self-propelled cranberry harvester, a berry gathering scoop having an air blast directed thereon, for blowing berries upwardly into control of a conveyer and for cleaning the berries by removing chaff, twigs, etc.

A further object of the invention is to provide an improved gathering scoop for a cranberry harvester comprising two sets of vertically reciprocating fingers which are forwardly directed and alternately spaced with regard to each other.

A further object of the invention is to provide an improved overhead conveyer positioned above the scoop, which carries resilient blades for guiding the berries and also suitable knives for cutting vines which may be carried up over the scoop fingers.

A further object of the invention is to provide a gathering scoop for a cranberry picker which may be quickly adjusted vertically by the operator in accordance with variations in the height of the cranberry bog.

A still further object of the invention is to provide in a self-propelled cranberry harvester improved means for transferring picked berries from the gathering scoop to a relatively narrow elevator without injuring the berries.

A still further object of the invention is to provide improved cranberry loading mechanism capable of being installed on a self-propelled cranberry harvester.

Further objects will be apparent from the specification and drawings, in which:

Fig. 6 is an enlarged longitudinal sectional detail of the scoop or gathering head, as seen at 6—6 of Fig. 2;

Fig. 7 is a transverse sectional detail of the device with parts broken away, as seen at 7—7 of Fig. 6;

Fig. 8 is an enlarged transverse sectional detail, as seen at 8—8 of Fig. 6;

Fig. 9 is a fragmentary sectional detail view on an enlarged scale showing the gear box and conveyer chain drive at one side of the gathering head, as seen at 9—9 of Fig. 1;

Fig. 10 is an enlarged fragmentary detail showing one of the resilient wiper blades on the conveyer chain;

Fig. 11 is a sectional view of the structure of Fig. 10, as seen at 11—11;

Fig. 12 is an enlarged perspective view showing one of the scoop fingers;

Fig. 13 is an enlarged sectional partial detail of the adjusting mechanism for the gathering head, as seen at 13—13 of Fig. 2;

Fig. 14 is a partial sectional view, as seen at 14—14 of Fig. 1;

Fig. 15 is a perspective showing the loading chute and platform at the rear of the harvester;

Fig. 16 is a sectional detail on an enlarged scale, as seen at 16—16 of Fig. 15; and Fig. 17 is a fragmentary view on an enlarged scale and with parts broken away showing a slightly modified construction for the bottom of the elevator assembly.

An important feature of the invention resides in the provision of a plurality of lightweight elongated picking fingers which are vertically oscillated by two parallel camshafts having similar cams which are so timed that no pivoting of the fingers takes place, i. e. every point on each finger describes a circle having a radius equal to the eccentricity of each cam. Every other pair of cams on the shafts is turned at approximately 180° so that half of the fingers are lowered when the other half are raised, and vice versa.

A special conveyer is mounted above the fingers and a plurality of resilient wipers which are secured to the conveyor in a staggered manner, traverse the upper portion of the fingers and serve to carry cranberries upwardly away from the fingertips. Air blasts are directed against the lower part of the fingers in the zone where the cranberries are severed from the vines. This feature is especially important in preventing loss of berries from the forward zone on the lower part of the fingers, in the event that the cranberry vines are not sufficiently dense to carry the berries upwardly on the fingers. These air blasts serve to direct the berries upwardly to a position in which they may be further carried by the wipers on the conveyer chain. The conveyer is also provided with a plurality of cutters so that if any lateral vines or runners are carried up the fingers, they will be cut before the machine can become jammed or clogged. The gathering head, including the fingers, blowers and conveyer, is pivotally mounted on the harvester frame and can be rapidly raised or lowered with respect to the framework by the operator through a suitable quick-acting adjustment power-driven from the motor.

After the cranberries have been carried beyond the upper termini of the fingers by the conveyer and wipers, they are blown into a relatively narrow trough from which they are removed by an elevator. Air blasts are directed laterally and oppositely into a zone between the trough and the termini of the fingers so that the cranberries are in effect floated into the trough. The berries drop from the top of the elevator into a convenient feed chute at the rear of the harvester and a pivoting barrier in the chute may be raised and lowered by an operator so that empty baskets are consecutively filled and removed from the harvester with a minimum of lost time.

Suitable driving connections and clutches are located on the frame of the harvester so that the various moving parts may be independently controlled by the operator.

Figure 2:
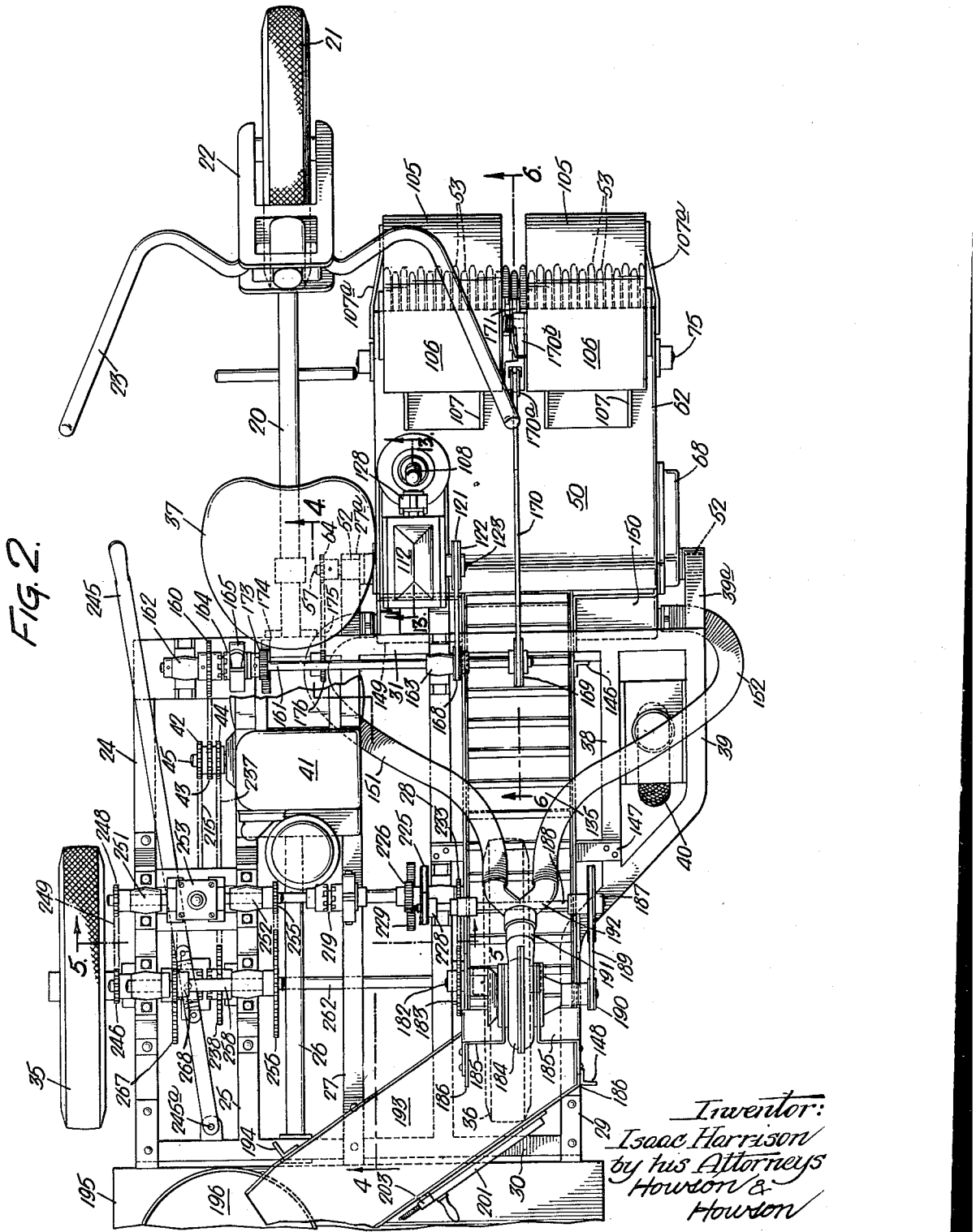
Fig. 2 is a top view of the harvester shown in Fig. 1.

Referring now more particularly to the drawings, my improved cranberry harvester comprises a tubular framework 20 which may if desired, be of conventional tricycle form having a front guiding wheel 21 mounted in fork 22 and pivotally controlled by handle bars 23. The rear part of the framework is formed from a plurality of longitudinal members 24, 25, 26, 27, 28 and 29, which are connected by transverse members 30 and 31. Frame members 24—31 in effect provide a platform adjacent the rear wheels 35 and 36 and in back of the operator's seat 37. Auxiliary frame members 38 and 39 are connected to member 29 and carry an outrigger caster wheel 40 which assists in balancing the weight of the harvester since the harvesting and elevating mechanism are located substantially to the right of the general centerline of the vehicle (Fig. 2).

A conventional internal combustion engine 41 mounted on frame members 26 and 27 is operatively connected to the various driven parts on the harvester through sprockets 42, 43 and 44 secured to engine crankshaft 45.

The cranberries are picked or gathered from the vines in the bog by means of a scoop assembly designated generally at 50 (Figs. 1, 2 and 6) which is pivotally supported on sub-frame 51 and struts 27a, 39a by trunnions 52. Two alternating series of oscillating fingers 53 are journaled on cams 54 of camshaft 55 and cams 56 of camshaft 57. As seen in Figs. 8, 10 and 11, the cams 56 are identical to each other but alternate cams are set 180° apart for a purpose to be described more fully hereinafter. It will be understood that each finger is mounted on a pair of cams one disposed on each of the camshafts, the cams of the pair being of equal eccentricity and corresponding phase. The construction of camshaft 55 and cams 54 is identical to that of camshaft 57, and the two camshafts are timed with respect to each other through spur gear 58 keyed to shaft 55 and spur gear 59 keyed to shaft 57. An idler gear 60 keyed to stub shaft 61 meshes with gears 58 and 59 to complete the driving connection between the two camshafts.

Shafts 55 and 57 are journaled in the scoop housing 62 by means of double row ball bearing assemblies 63 which are in turn mounted in bearing housings 63a secured to the upper scoop housing 62a by bolts 63b. Camshaft 57 extends through housing 62 opposite gear 59, and is provided with a sprocket 64 which is connected indirectly to the engine 41. A needle bearing 65 provides added support for shaft 57 adjacent sprocket 64. The relatively short bottom 62b of housing 62 also serves as a stiffening spacer element for the scoop in conjunction with two stay bolts 66 which extend through flanges on the bottom 62b, spacing sleeves 67 and trunnion brackets 52a, 68a, the latter of which is formed integrally with the gear box housing 68 (Fig. 8).

The oscillatory motion of fingers 53 is shown clearly in Figs. 6 and 8, from which it will be seen that the timing of cams 54 and 56 is such that every part of each finger has a simultaneous equal vertical increment of movement so that there is no pivoting of the finger with respect to the cranberry bog or the harvester. This feature has been found to be of importance in the proper gathering and conveying of the cranberries because they are picked from the vines by the oscillations of the fingers 53 combined with the downwardly and forwardly sloping top edges of the fingers. Each finger is provided with a narrow resilient extension 53a which is secured to the rear of the finger by means of a screw 69. Preferably the fingers may be cast from a lightweight metal or alloy such as aluminum or magnesium. However, I find that the fingers may be fabricated from any properly seasoned hardwood. The fingers 53 can be readily attached and detached to the camshafts by means of detachable segments 53c which are retained on each finger by means of countersunk cap screws 53d (Figs. 10 and 11).

Lateral spacing of the fingers on camshafts 55 and 57 is accomplished by means of thin collars or washers 70 which are permitted to rotate freely on the camshafts to minimize the likelihood of vines wrapping around the collars and jamming the mechanism. To facilitate assembly, the cams may be individually pinned or keyed to the shafts 55 and 57 by pins such as shown at 55a in Fig. 11.

The scoop conveyer assembly designated generally at 71 (Fig. 6) comprises a pair of endless chains 72 and 73 mounted on sprockets 74 keyed to cross shafts 75 and 76 journaled in the upper scoop housing 62a. Shaft 76 is provided with a pair of adjustable bearing blocks 77 and is retained therein by cams 78. Shaft 76 also carries a sprocket 79 at one end thereof which is drivingly connected to sprocket 80 on stub shaft 61 by means of chain 81 (as shown in Figs. 8 and 9). The sides 62d of upper housing 62a extend forwardly to provide a pair of relatively high stationary walls 62e on either side of the fingers. When a long runner or horizontal vine is picked up by the scoop fingers, it is cut by one or both of a pair of similar oscillating double-edged cutters 82 pivoted on each side of the upper scoop housing 62a. The cutters 82 cooperate on both the up and down strokes with stationary knives 82a and are so actuated by means of links 83 pivotally connected to the cutters and to rocker arms 84 journaled in housing 62a on shoulder screws 84a. The rocker arms are in turn driven by the cams 78 on shaft 76.

The chains 72 are provided with carriers 85 (Fig. 10) to which transverse angle bars 86 are secured by means of rivets 87. Angle bars 86 support a plurality of resilient blade assemblies 88 by means of screws 89. These blade assemblies 88 are located in staggered pairs on successive angles 86 (Fig. 8). Each blade assembly 88 comprises a non-metallic face plate 90 which is riveted to the spring bracket 91, as shown clearly in Figs. 10 and 11. The blade assemblies 88 of each pair are closely spaced to each other on the angles 86, although there is substantial distance between the pairs of assemblies on each angle. Between each pair of blade assemblies 88, I attach a cutter assembly 92 to the angles 86 by means of rivets 93. The cutter 92 comprises a generally rectangular block 92a slotted to engage the vertical web of angle 86 and provided with a pair of notches 94 (one above the other) having beveled edges 95. A sharp cutting knife 96 is recessed and retained in the block 92 by screw 97 so that any vines or foreign material entering notches 94 will be cut when pressed against the edge of the knives 96.

The height of each notch 94 is substantially less than the diameter of a cranberry C in order to prevent the possibility of berries entering the notches. In this way, the berries cannot become cut or sliced by the knives. Furthermore, the width of the blocks 92a is likewise substantially less than the diameter of a cranberry and the close spacing of the face plates 90 of adjacent pairs of blade assemblies to the block 92a assists in pushing any berries away from the notches 94. However, when an uncut vine comes in contact with one or more of the plates 90, the resiliency of brackets 91 permits the plates to bend backwardly, thus allowing the vine to enter one of the notches 94 and to engage the knife 96.

Figure 1:
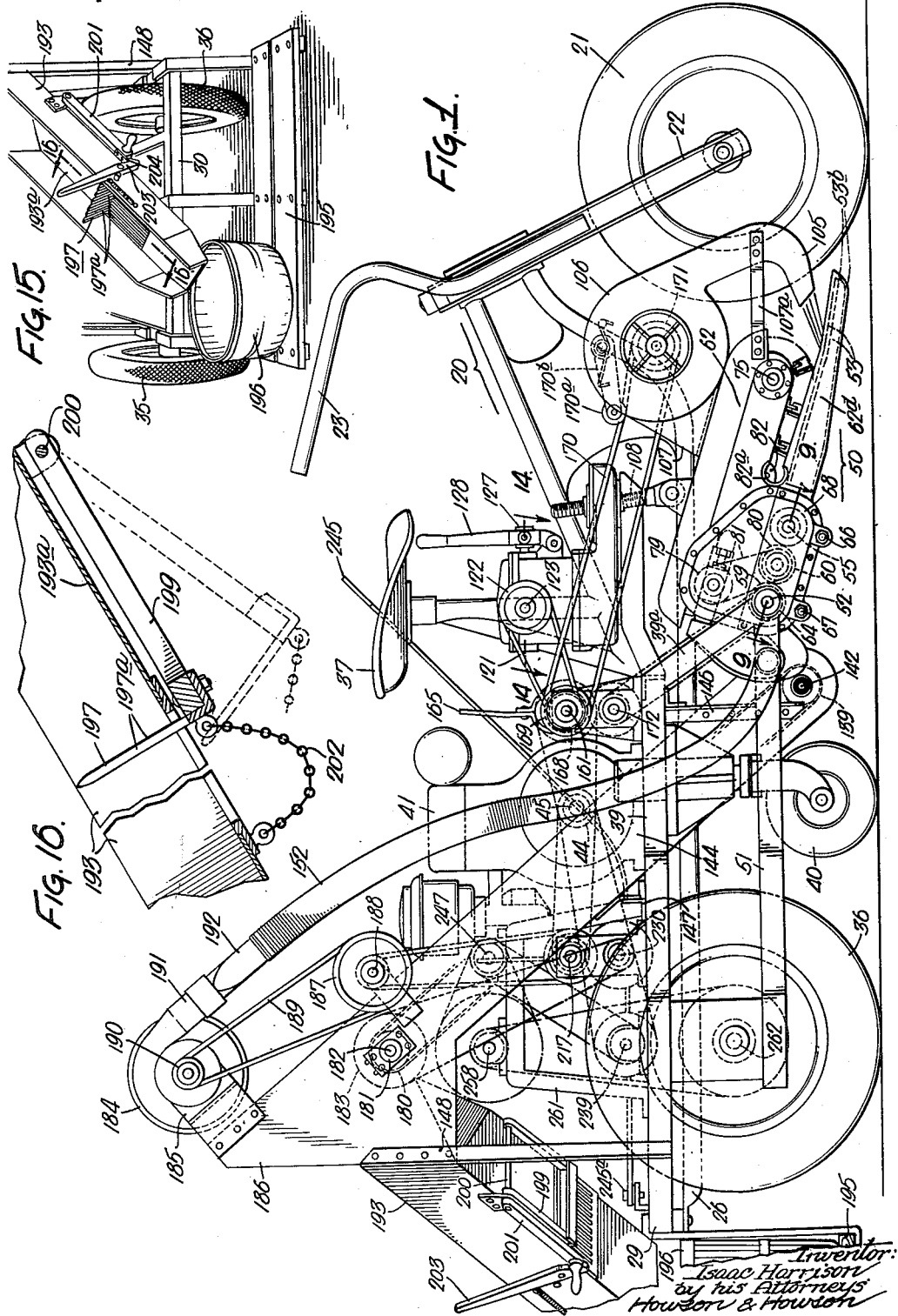
Fig. 1 is a side view of a cranberry harvester constructed in accordance with the present invention.

As seen in Fig. 6, the conveyer assembly, comprising chains 72 and blade assemblies 88, is mounted above and in close spaced relation to the fingers 53. As the berries C progress beyond a point such as 98 on the fingers, they are engaged by blade assemblies 88 on the lower flight of the conveyer which moves from front to back towards the cams. In this manner the berries are conveyed upwardly along the top edges of the fingers until they roll onto and off of the extensions 53a. It is important to note that the amplitude or eccentricity of cams 54 and 56 is calculated so that the clearance between the bottom edges 90a of the face plates and the fingers, even when the fingers are in their lowermost position, never exceeds the diameter of a cranberry. This prevents the berries from rolling backward down the tops of the fingers, and insures that all of the berries will be carried upwardly by the blade assemblies. Suitable adjustment for chains 72 and for the clearance between the tops of the fingers and the blades is provided by means of adjusting screws 99 which are mounted in bearing block 77 as to exert pressure as desired against shaft 76 so that the chain may be retained in any adjusted position by means of lock nuts 101. To insure that the berries are cleaned of foreign matter and that they are properly positioned in a zone to be engaged by blades 88, I provide air blasts directed against the forward tips 53b of the blades through nozzles 105 of blowers 106. The blowers 106 are mounted on frame 20 (as shown in Fig. 1) and the nozzles are reinforced by means of brackets 107 and braces 107a.

A particular feature of my improved cranberry harvester construction resides in the ability of the operator to quickly raise and lower the forward tips 53b of the scoop as may be required by the nature of the bog being harvested. For this purpose, I provide a support in forward spaced relation to the support means 52 comprising a threaded eyebolt 108 pivotally connected to and forwardly supporting the upper housing 62a by means of a clevis 109 and a pin 110. A rotatable nut assembly 111 is journaled in housing 112 and engages a threaded shank in eyebolt 108 so that when nut 111 is turned, the eyebolt and the scoop 50 are raised and lowered in accordance with the position of nut 111 on the shank of the eyebolt. The nut is provided with suitable limited swiveling means such as sleeve 111a to permit limited pivoting of the eyebolt which is incident to the horizontal component of the movement of clevis 109.

Nut 111 is journalled on bearings 113 in housing 112 and may be formed integrally with a sprocket 114 driven from sprocket 115 by means of chain 116 (Fig. 13). Sprocket 115 is keyed to a shaft 117 which is journaled in the housing by bearings 118 and 119, and also keyed to a bevel gear 120. Driving power for actuating the raising and lowering mechanism is introduced to the housing 112 through a belt 121 and pulley 122 (Fig. 14). Pulley 122 is keyed to a shaft 123 journaled in housing 112 and the opposite end of the shaft is provided with a beveled friction face 124 which may be selectively engaged with juxtaposed beveled friction faces 125 and 126 keyed to slidable shaft 127. Shaft 127 is journaled in housing 112 and may be moved axially in the journals by means of a control lever 128 pivoted to the housing at 129 and connected to a yoke 130 having a rotatable connection with shaft 127. A wide faced sliding spur gear 131 is keyed to shaft 127 and meshes with spur gear 132 journaled on a shoulder cap screw 133 which is likewise fixed in the housing. Gear 132 is keyed or formed integrally with a beveled gear 134 which meshes with beveled gear 120. It will be understood that lever 128 normally has three positions, the first of which is the "at-rest disengaged" position shown in Fig. 14, in which face 124 does not engage either face 125 or 126.

When it is desired to raise or lower the scoop 71, the operator moves lever 128 to slide shaft 127, thus engaging one or the other of the friction faces 125, 126 with the driving member 124, to complete the drive from the constantly moving shaft 123 to nut 111 through spur gears 131, 132, bevel gears 134, 120, sprockets 115, 114 and chain 116. Depending upon which face is engaged with member 124, the scoop is accordingly raised or lowered in trunnions 52. A shield 62c is conveniently employed to cover the top of the scoop assembly and the shield flares transversely beyond housing 62a to enclose sprocket 79 and to complete the upper part of gear box 68.

After the cranberries are gathered and deposited over extensions 53a, they are carried by an elevator assembly 135 to a point near the rear of the harvester. The elevator assembly comprises a conveyer belt 136 having a plurality of resilient blades 137 preferably of rubber, secured thereto by means of rivets 138. The conveyer belt 136 passes over a lower roller 139 (Fig. 7) which is journaled on annular bearings 140 mounted on stationary sleeve 141. A shaft 142 passing through sleeve 141 secures the shaft and roller to shoulder collars 143. Conveyer 136 runs in a trough 144 having two vertical sides 144a, 144b which enclose the top flight 136a of the conveyer. The bottom 144c of the trough extends around the lower part of the conveyer and terminates in an upwardly extending lip 145 (as shown in Fig. 6). The elevator assembly is mounted on the frame at the front by means of vertical braces 146, at the center by a cross brace 147, and at the rear by means of a vertical brace 148.

Since the width of the scoop is considerably greater than the width of the conveyer belt 136, I provide a pair of hoppers 149, 150 which extend laterally from the sides 144a, 144b of the trough to the sides of the scoop housing 62. Any berries falling into hoppers 149, 150 are blown inwardly by means of air blasts introduced into the hoppers through flexible hose 151 and 152. I have found that by using these oppositely disposed air blasts, a turbulent cushion is created in the zone above the conveyer which assists in depositing the berries on the conveyer belt without injury. The hoppers 149 and 150 have closed ends 153 and 154 and are mounted on the scoop assembly so that they pivot with the scoop. A pair of guard plates 155 and 156 are exteriorly welded around the inwardly facing edges of each hopper and provide a sliding sealed connection with each side 144a and 144b of the trough 144. It will be understood that berries falling from the center group of fingers 53a drop directly onto the conveyer or are guided to the conveyer by means of lip 145. Berries falling from the side groups of fingers 53a drop into hoppers 149 and 150 from whence they are blown onto the conveyer.

In the construction described above, the hoppers 149 and 150 are rigidly attached to the scoop assembly. Fig. 17 shows a slightly modified construction in which the hoppers 149a and 150a (not shown) are secured to the sides 244a and 244b respectively of the trough 244. In this way a constant spacing between the hoses 151 and 152 and the elevator assembly 135 is maintained at all times.

Figure 4:
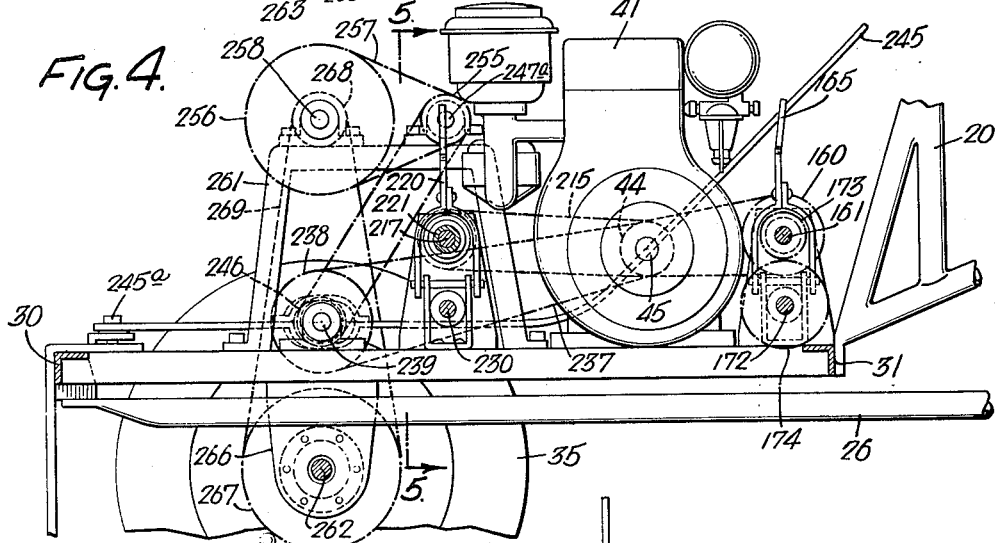
Fig. 4 is an enlarged fragmentary longitudinal sectional view, as seen at 4—4 of Fig. 2.
Figure 5:
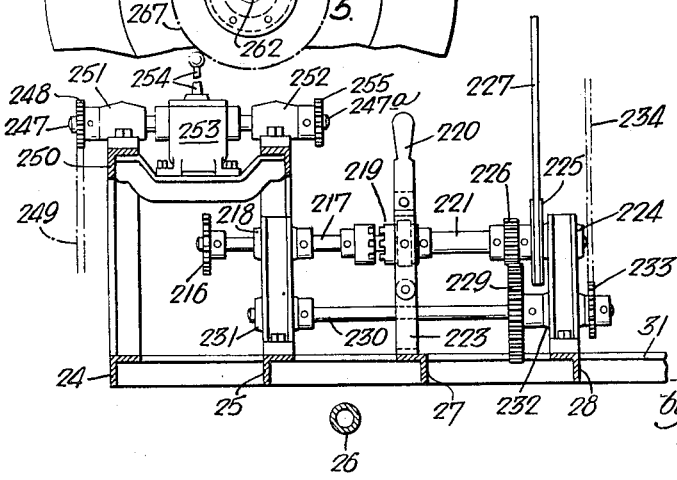
Fig. 5 is an enlarged fragmentary transverse sectional view, as seen at 5—5 of Figs. 2 and 4.

The driving connections for the forward blowers, the scoop fingers and conveyer, and the power scoop raising mechanism will now be described. Referring to Figs. 1, 2 and 4, sprocket 43 on engine crankshaft 45 drives sprocket 160 which is freely rotatable on countershaft 161 journaled in bearings 162 and 163. A sliding dog clutch assembly 164 operated by a lever 165, furnishes a selective driving connection between sprocket 160 and shaft 161. The drive for the pulley 122 of the elevating mechanism is through a pulley 168 keyed to shaft 161. The drive for blowers 106 is from pulley 169 keyed to shaft 161, belt 170 and pulley 171. Automatic tensioning for belt 170 is provided by means of pulley 170a journaled on a spring-loaded arm 170b. A second countershaft 172 journaled in frame members 25 and 27 underneath shaft 161 is driven from this shaft through meshing spur gears 173 and 174 and operates the scoop camshaft 57 through sprocket 64, chain 175 and sprocket 176. It will thus be understood that the disengagement of clutch 164 simultaneously disconnects the drive for the scoop fingers, the scoop conveyer, the elevating mechanism, and the forward blowers.

Referring now to Figs. 1, 2 and 15, the upper roller 180 for the conveyer belt 136 is adjustably journaled in bearings 181 and is provided with a shaft 182 having a sprocket 183 keyed thereto. A blower 184 mounted on brackets 185 is secured to extensions 186 of the conveyer trough. Blower 184 is driven through pulley 187 on shaft 188, belt 189, and pulley 190 on the blower shaft. The discharge 191 from the blower 184 is provided with a Y 192, each side of which is connected to the flexible hoses 151 and 152.

After the berries fall from conveyer belt 136, they are received by a chute 193 secured to the rear frame member 30 by braces 148 and 194. Chute 193 extends diagonally and rearwardly of the harvester structure and terminates over a platform 195 suspended from rear frame member 30. An operator standing on platform 195 can conveniently place baskets 196 under the lower end of chute 193 (as shown in Figure 15). In order to facilitate consecutive filling of the baskets, I provide a gate assembly 197 to temporarily arrest the fall of berries from the chute. The bottom 193a of chute 193 contains a series of slots through which a plurality of gate fingers 197a protrude. The fingers are mounted on a bracket 199 pivotally attached to the bottom 193a at 200. A handle 201 permits the operator to raise and lower fingers 197a (as shown in Fig. 16) and a tie chain 202 limits downward pivoting of the fingers. The fingers and bracket can be locked in the raised position by means of a spring-loaded latch 203 which engages a detent 204 on handle 201.

Referring now to Figs. 1–5, the driving mechanism for the wheels 35 and 36 as well as the blower 184 and elevator 135, will be described. The blower 184 and elevator 135 are each driven through chain 215 connected to sprocket 42 on motor crankshaft 45, and sprocket 216 keyed to shaft 217 (Fig. 5) which is journaled at 218 to frame member 25. A sliding dog clutch assembly 219 operated by a lever 220 supplies a selective driving connection between shaft 217 and sleeve 221. Lever 220 is pivotally mounted on bracket 223 and secured to frame member 27. Sleeve 221 is journaled on frame member 28 at 224 and is keyed to a pulley 225 and a spur gear 226. Belt 227 driven by pulley 225 drives the blower 184 through pulley 228 (Fig. 2) which is keyed to shaft 188. The elevator 135 is driven from gear 226 through meshing gear 229 keyed to jackshaft 230 which is journaled at 231 and 232 on frame members 25 and 28. A sprocket 233 on shaft 230 is drivingly connected to sprocket 183 by means of chain 234. This completes the drive for the elevator 135 and blower 184. It will also be noted that this drive for the elevator and blower 184 may be disconnected at will by manipulating lever 220.

Figure 3:
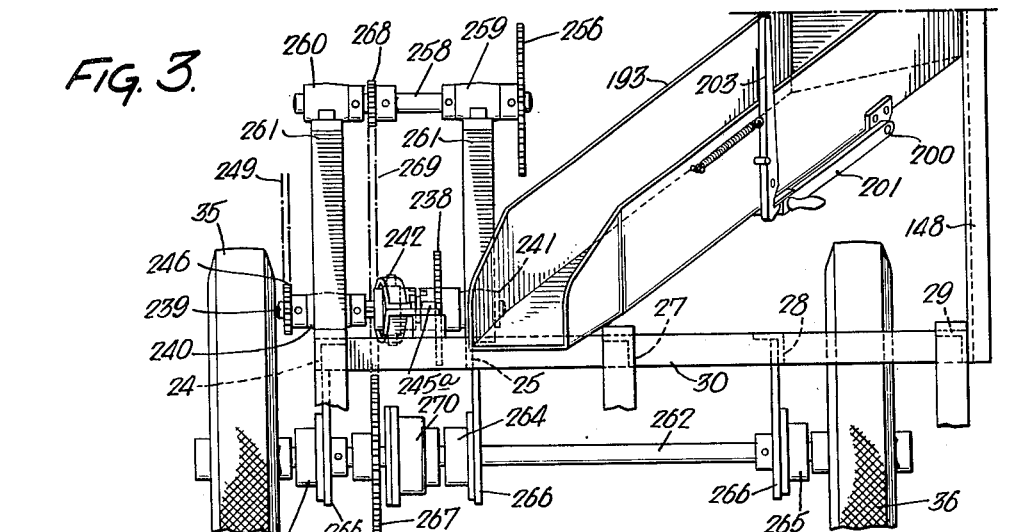
Fig. 3 is an enlarged fragmentary rear view with the platform removed, showing the drive mechanism for the wheels.

The wheels 35 and 36 are driven from sprocket 44 and engine crankshaft 45, through a chain 237 and sprocket 238, which is freely rotatable on shaft 239 (Fig. 3). Shaft 239 is journaled at 240 and 241 on frame members 24 and 25 and is provided with a sliding dog clutch assembly 242 operable by lever 245 to selectively connect shaft 239 and sprocket 238. Lever 245 extends to an accessible position near the operator's seat 37 and is pivoted to frame member 30 at 245a. Sprocket 246 keyed to shaft 239 drives shaft 247 (Fig. 5) by means of a sprocket 248 and chain 249. Shaft 247 is journaled on frame member 250 at 251 and 252 and is driven through a selective speed gear box 253, controllable by means of shift lever 254. Sprocket 255 on shaft 247a is drivingly connected to sprocket 256 by chain 257 which is in turn keyed to shaft 258 (Fig. 3). Shaft 258 is journaled at 259 and 260 on brackets 261. The live axle 262 for the harvester is journaled at 263, 264 and 265 from frame members 24, 25 and 28 by brackets 266. The drive for axle 262 is through sprocket 267 connected to sprocket 268 on shaft 258 by chain 269. A conventional differential 270 may be provided for axle 262.

It will thus be understood that I have provided three independently controlled driving trains for the harvester. As explained above, the driving connections for the scoop, forward blowers and elevating mechanism is controlled by clutch 164; the drive for the elevator and rear blower is controlled by lever 220; and the drive to the wheels is through lever 245.

I have thus provided a lightweight compact cranberry harvester which is capable of being operated over a cranberry bog without damage to the vines and one which can be driven without interruption due to the automatic conveying and loading mechanism. The construction of the scoop and the actuation of the fingers provide quick, clean harvesting with a minimum of loss.

Having thus described my invention,

I claim:

1. A scoop assembly for self-propelled cranberry harvesters comprising a housing, a pair of camshafts journaled transversely in said housing, a first series of cams on said camshafts, a second series of cams on said camshafts disposed between the cams of said first series and alternating with the cams of said first series, each series comprising pairs of longitudinally aligned cams of equal eccentricity and corresponding phase, a forwardly extending finger journaled on each pair of said cams, means for driving said camshafts in timed relation to each other, whereby the ends of alternate fingers oscillate in unison to tap cranberries from the vines.

2. A scoop assembly for self-propelled cranberry harvesters comprising a housing, a pair of camshafts journaled transversely in said housing, a first series of cams on said camshafts, a second series of cams on said camshafts, said second series of cams being timed 180° apart from said first series and disposed therebetween, each series comprising pairs of longitudinally aligned cams of equal eccentricity and corresponding phase, a forwardly extending finger journaled on each pair of said cams, and means for driving said camshafts in timed relation to each other, whereby the ends of alternate fingers oscillate in unison to tap cranberries from the vines.

3. A scoop assembly for self-propeller cranberry harvesters comprising a housing, a pair of camshafts journaled transversely in said housing, a plurality of pairs of cams of equal eccentricity the cams of each pair being mounted respectively on said camshafts, and certain of said pairs being oppositely phased with respect to others of said pairs, a forwardly extending finger journaled on each pair of said cams, means for driving said camshafts in timed relation to each other, at least one endless chain-like member movably mounted above the fingers, a plurality of cross bars carried by said chain-like member, and a plurality of blades mounted on said cross bars positioned to depend downwardly from the lower flight of the chain-like member.

4. A scoop assembly for self-propelled cranberry harvesters comprising a housing, a pair of camshafts journaled transversely in said housing, a plurality of pairs of cams of equal eccentricity one cam of each pair mounted on the respective camshafts, and certain of said pairs being oppositely phased with respect to others of said pairs, a forwardly extending finger journaled on each pair of said cams, means for driving said camshafts in timed relation to each other, at least one endless chain-like member mounted above the fingers, a plurality of cross bars carried by said chain-like member, a plurality of blades mounted on said cross bars positioned to depend downwardly from the lower flight of the chain-like member, and a resilient mounting between the blades and the cross bars, said mountings being in staggered relation on successive cross bars.

5. A scoop assembly for self-propelled cranberry harvesters comprising a housing, a pair of camshafts journaled transversely in said housing, a plurality of pairs of cams of equal eccentricity one cam of each pair mounted on the respective camshafts, and certain of said pairs being oppositely phased with respect to others of said pairs, a forwardly extending finger journaled on each pair of said cams, means for driving said camshafts in timed relation to each other, at least one endless chain-like member mounted above the fingers, a plurality of cross bars carried by said chain-like member, a plurality of blades mounted on said cross bars positioned to depend downwardly from the lower flight of the chain-like member, a resilient mounting between the blades and the cross bars, said mountings being in staggered relation on successive cross bars, and a knife rigidly attached to the cross bars adjacent the blades and positioned so that the blades normally project beyond the forward edge of the knife and may be flexed to expose the knife upon the application of predetermined pressure to the blades.

6. A scoop assembly in accordance with claim 5, in which the transverse spacing between the blades and the knife is less than the diameter of a cranberry.

7. A scoop assembly in accordance with claim 5, in which the blades are arranged in pairs and the knife is attached to the cross bars between the blades of each pair.

8. A scoop assembly for self-propelled cranberry harvesters comprising a housing, a pair of camshafts journaled transversely in said housing, a plurality of pairs of cams of equal eccentricity one cam of each pair mounted on the respective camshafts, and certain of said pairs being oppositely phased with respect to others of said pairs, a forwardly extending finger journaled on each pair of said cams, means for driving said camshafts in timed relation to each other, a conveyer mounted above said fingers, the lower flight of said conveyer being movable backwardly from the tips of the fingers towards the cams, and at least one blower mounted on the scoop having a discharge nozzle directed along the tops of the fingers to convey berries from the finger tips to the zone traversed by the conveyer.

9. A scoop assembly in accordance with claim 5, in which the blades are arranged in pairs and the knife is attached to the cross bars between the blades of each pair, and having at least one blower mounted on the scoop having a discharge nozzle directed along the tops of the fingers to convey berries from the finger tips to the zone traversed by the blades.

10. In a self-propelled cranberry harvester having a frame, an engine mounted on said frame, and a cranberry picking scoop, the combination which comprises: a scoop housing, means pivotally mounting said housing on said frame, a pair of camshafts journaled transversely in said housing, a plurality of closely spaced cams on each camshaft, alternate cams on each shaft having throws substantially 180° apart, timing connections between said camshafts, and at least two sets of picking fingers operatively controlled by respective pairs of aligned cams on each camshaft.

11. A scoop assembly for self-propelled cranberry harvesters comprising a housing, a pair of camshafts journaled transversely in said housing, a plurality of pairs of cams of equal eccentricity one cam of each pair mounted on the respective camshafts, a forwardly extending finger journaled on each pair of said cams, means for driving said camshafts in timed relation to each other, and spacing collars between adjacent picking fingers, the width of said spacing collars being substantially less than the diameter of the berries to be harvested.

12. In a self-propelled cranberry harvester having a frame, an engine mounted on said frame, and a cranberry picking scoop, the combination which comprises: a scoop housing, means pivotally mounting said housing on said frame, a pair of camshafts journaled transversely in said housing, a plurality of closely spaced cams on each camshaft, alternate cams on each shaft having throws substantially 180° apart, timing connections between said camshafts, two sets of picking fingers operatively controlled by respective pairs of aligned cams on each camshaft, and spacing collars between adjacent picking fingers, the width of said spacing collars being substantially less than the diameter of the berries to be harvested.

13. In a self-propelled cranberry harvester having a frame, an engine mounted on said frame, and a cranberry picking scoop, the combination which comprises: a scoop housing, means pivotally mounting said housing on said frame, a pair of camshafts journaled transversely in said housing, a plurality of closely spaced cams on each camshaft, alternate cams on each shaft having throws substantially 180° apart, timing connections between said camshafts, two sets of picking fingers operatively controlled by respective pairs of aligned cams on each camshaft, spacing collars between adjacent picking fingers, the width of said spacing collars being substantially less than the diameter of the berries to be harvested, and means including a conveyer positioned above said sets of fingers for moving cranberries along the tops of the fingers.

14. In a self-propelled cranberry harvester having a frame, an engine mounted on said frame, and a cranberry picking scoop, the combination which comprises: a scoop housing, means pivotally mounting said housing on said frame, a pair of camshafts journaled transversely in said housing, a plurality of closely spaced cams on each camshaft, alternate cams on each shaft having throws substantially 180° apart, timing connections between said camshafts, two sets of picking fingers operatively controlled by respective pairs of aligned cams on each camshaft, spacing collars between adjacent picking fingers, the width of said spacing collars being substantially less than the diameter of the berries to be harvested, means including a conveyor positioned above said sets of fingers for moving cranberries along the tops of the fingers, and means including a knife mounted on said conveyor for cutting vines coming in contact with the conveyer over the fingers.

15. In a self-propelled cranberry harvester having a frame, an engine mounted on said frame, and a cranberry picking scoop, the combination which comprises: a scoop housing, means pivotally mounting said housing on said frame, a pair of camshafts journaled transversely in said housing, a plurality of closely spaced cams on each camshaft, alternate cams on each shaft having throws substantially 180° apart, timing connections between said camshafts, two sets of picking fingers operatively controlled by respective pairs of aligned cams on each camshaft, spacing collars between adjacent picking fingers, the width of said spacing collars being substantially less than the diameter of the berries to be harvested, means including a conveyer positioned above said sets of fingers for moving cranberries along the tops of the fingers, means including a knife mounted on said conveyer for cutting vines coming in contact with the conveyer over the fingers, and means including at least one blower for directing an air blast along the tops of the sets of fingers from front to back to move cranberries into a zone traversed by the conveyer.

16. A scoop assembly for self-propelled cranberry harvesters having a housing comprising two spaced apart side walls, a pair of camshafts journaled in spaced relation in said side walls, a plurality of pairs of radially aligned cams of equal eccentricity on said camshafts, said pairs of cams being disposed between said side walls, a plurality of elongated fingers actuated one by each pair of said cams, and means for driving said camshafts in timed relation each to the other whereby the ends of alternate fingers oscillate in unison to tap cranberries from the vines.

17. A scoop assembly for self-propelled cranberry harvesters having a housing comprising two spaced apart side walls, a pair of camshafts journaled in spaced relation in said side walls, a plurality of pairs axially aligned cams of equal eccentricity on said camshafts, said pairs of cams being disposed on said camshafts between said side walls, and a plurality of elongated fingers journaled on and actuated one by each pair of said cams so that the ends of alternate fingers oscillate in unison to tap cranberries from the vines.

18. A scoop assembly for self-propelled cranberry harvesters comprising a pair of suitably journaled camshafts, a plurality of pairs of cams of equal eccentricity and identical phase relation spaced axially along said camshafts, a plurality of pairs of cams disposed between said first mentioned pairs and being of equal eccentricity but opposite phase relation to said first mentioned pairs of cams, and a plurality of fingers mounted one on each of said pairs, whereby alternate fingers oscillate in unison to tap cranberries from the vines.

19. A scoop assembly for self-propelled cranberry harvesters comprising a pair of suitably journaled camshafts, a plurality of pairs of cams of equal eccentricity and identical phase relation spaced axially along said camshafts, a plurality of pairs of cams disposed between said first mentioned pairs and being of equal eccentricity but opposite phase relation to said first mentioned pairs of cams, and a plurality of fingers mounted one on each of said pairs of cams, one of said camshafts being disposed in spaced relation to one end of said fingers whereby alternate fingers oscillate in unison and the free ends of said fingers operate to tap cranberries from the vines.

20. A scoop assembly for self-propelled cranberry harvesters comprising a pair of suitably journaled camshafts, a plurality of pairs of cams of equal eccentricity and identical phase relation spaced axially along said camshafts, a plurality of pairs of cams disposed between said first mentioned pairs and being of equal eccentricity but phased 180° from said first pairs of cams, a plurality of fingers mounted one on each of said pairs whereby alternate fingers oscillate in unison to tap cranberries from the vines.

21. A scoop assembly for self-propelled cranberry harvesters comprising a pair of suitably journaled camshafts, a plurality of pairs of cams of equal eccentricity and identical phase relation mounted one on each of said camshafts, a plurality of pairs of cams disposed between said first mentioned pairs and of equal eccentricity but oppositely phased from said first mentioned pairs of cams, a plurality of fingers mounted one on each of said pairs of cams, one of said camshafts being disposed adjacent one end of each finger and the other of said camshafts being disposed intermediate the ends of said fingers, whereby alternate fingers oscillate in unison to tap cranberries from the vines.

22. A self-propelled cranberry harvester comprising a frame, power means mounted on said frame and operable to propel said harvester, a scoop assembly pivotally mounted on said frame and operable upon motion of said harvester to tap cranberries from the vines, said scoop assembly including a pair of camshafts journaled transversely therein, a plurality of closely spaced cams of equal eccentricity on each camshaft, alternate cams on each shaft having throws substantially 180° apart and corresponding cams on each shaft forming a pair, means for rotating said camshafts in timed relation, a plurality of elongated fingers mounted one on each of said pairs of cams, and means for lowering and raising said scoop assembly with respect to the frame.

23. A self-propelled cranberry harvester having a frame, power means mounted on said frame, a relatively wide scoop assembly mounted on said frame and actuated by said power means, an elevator of substantially less width than said scoop actuated by said power means, disposed adjacent the rear edge of said scoop and positioned to receive cranberries delivered from said scoop, a pair of hoppers positioned one on each side of elevator to receive cranberries not received directly into said elevator, and a blower having conduits communicating with said hoppers for directing air blasts across said hoppers to transfer berries from the hoppers into the said elevator.

24. Apparatus in accordance with claim 23 in which the hoppers are mounted on the scoop.

25. A self-propelled cranberry harvester having a frame, power means mounted on said frame, a relatively wide scoop assembly mounted on said frame and actuated by said power means, an elevator of substantially less width than said scoop actuated by said power means and disposed adjacent the rear edge of said scoop and positioned to receive cranberries delivered from said scoop, a pair of hoppers positioned one on each side of said elevator to receive cranberries not received directly into said elevator, a chute mounted on the rear of said frame positioned to receive berries delivered from said elevator and means in said chute for selectively stopping the flow of berries.

26. Apparatus in accordance with claim 25 in which the means forstopping the flow of berries comprises a plurality of fingers pivotally mounted on the scoop to extend through a wall of the chute.

27. A self-propelled cranberry harvester including a frame, an engine mounted on said frame, wheels rotatively mounted on said frame, means connecting said engine and said wheels, a cranberry picking scoop assembly pivoted at one end to said frame, means for adjustably suspending the other end of said scoop assembly so that it may be raised or lowered as desired, and means connecting said engine and said last named means.

28. A self-propelled cranberry harvester including a frame, an engine mounted on said frame, wheels rotatively mounted on said frame, means connecting said engine and said wheels, a cranberry picking scoop assembly pivoted at one end to said frame, means for adjustably suspending the other end of said scoop assembly so that it may be raised or lowered as desired, said scoop assembly comprising a plurality of oscillating fingers, and means drivingly connecting said engine and said oscillating fingers.

29. A self-propelled cranberry harvester including a frame, an engine mounted on said frame, wheels rotatively mounted on said frame and actuated by said engine, a cranberry picking scoop assembly pivotally mounted at one end to said frame, said scoop assembly comprising means for oscillatingly mounting a plurality of elongated fingers, means drivingly connecting said engine and said fingers whereby cranberries are tapped from the vines as the harvester moves forwardly and the fingers oscillate, means for raising and lowering the other end of said scoop assembly, means drivingly connecting said engine and said raising and lowering means, a conveyor mounted in said scoop above said fingers for propelling the cranberries after they have been severed from the vines and means drivingly connecting said fingers and said conveyor.

30. A self-propelled cranberry harvester including a frame, an engine mounted on said frame, wheels rotatively mounted on said frame and actuated by said engine, a cranberry picking scoop assembly pivotally mounted at one end to said frame, said scoop assembly comprising means for oscillatingly mounting a plurality of fingers, means drivingly connecting said fingers with said engine whereby cranberries are tapped from the vines by the oscillation of said fingers, means for raising and lowering the other end of said scoop assembly, means drivingly connecting said engine and said raising and lowering means, a conveyor mounted in said scoop assembly above said fingers for propelling the cranberries rearwardly after they have ben severed from the vines by said fingers, means drivingly connecting said engine and said conveyor, at least one blower mounted on the forward end of said scoop assembly to propel the cranberry rearwardly into engagement with said conveyor and means drivingly connecting said engine and said blower.

ISAAC HARRISON.

References Cited in the file of this patent

UNITED STATES PATENTS

| Number | Name | Date |
|---|---|---|
| 666,865 | Helfensteller, Jr. | Jan. 29, 1901 |
| 1,227,182 | Neal | May 22, 1917 |
| 1,363,533 | Roe | Dec. 28, 1920 |
| 1,374,424 | Brook | Apr. 12, 1921 |
| 1,725,843 | Atwood | Aug. 27, 1929 |
| 2,230,139 | Gustin | Jan. 28, 1941 |
| 2,445,162 | Wallace | July 13, 1948 |
| 2,459,471 | Tebbetts | Jan. 18, 1949 |